United States Patent [19]
Takizawa

[11] Patent Number: 5,109,732
[45] Date of Patent: May 5, 1992

[54] ADAPTIVE CONTROL OF SERVO ACTIVATING PRESSURE FOR MOTOR VEHICLE AUTOMATIC TRANSMISSION

[75] Inventor: Satoshi Takizawa, Yokosuka, Japan

[73] Assignee: Nissan Motor Co., Ltd., Yokohama, Japan

[21] Appl. No.: 624,236

[22] Filed: Dec. 7, 1990

[30] Foreign Application Priority Data

Dec. 15, 1989 [JP]  Japan .................. 1-324083

[51] Int. Cl.$^5$ ............................................. B60K 41/18
[52] U.S. Cl. ............................................. 74/866
[58] Field of Search ........................................ 74/866

[56] References Cited

U.S. PATENT DOCUMENTS

| | | | |
|---|---|---|---|
| 4,627,311 | 12/1986 | Yokooku et al. | 74/866 |
| 4,744,031 | 5/1988 | Takeda et al. | 74/866 X |
| 4,825,372 | 4/1989 | Yasue et al. | 74/866 X |
| 4,939,957 | 7/1990 | Asano et al. | 74/866 |

FOREIGN PATENT DOCUMENTS 0007739  2/1980  European Pat. Off. .
57-184755 11/1982 Japan .
62-166118  7/1987 Japan .
64-87949   4/1989 Japan .

Primary Examiner—Leslie A. Braun
Assistant Examiner—Ryan W. Massey
Attorney, Agent, or Firm—Foley & Lardner

[57] ABSTRACT

The present invention relates to an adaptive correction of servo activating hydraulic fluid pressure in agreement with driving force variability. In one embodiment according to the present invention, a ratio of a mass airflow of intake air admitted to an engine (Qa) and a revolution speed of a transmission output shaft (No) is calculated, and a parameter (TqSEN) is determined as a function of the ratio (Qa/No). The servo activating hydraulic fluid pressure is determined in response to this parameter. In another embodiment, a turbine shaft speed (Nt) is calculated from the output shaft speed (No) and a gear ratio (g) of a gear position established before shifting. The turbine shaft revolution speed (Nt) is used instead of the output shaft revolution speed (No) in determining a parameter (TqSEN).

8 Claims, 12 Drawing Sheets

SHIFT POINT AT LOW SPEED (MANUAL RANGE)

SHIFT POINT AT SET SPEED (DRIVE RANGE)

SHIFT POINT AT HIGH SPEED (MANUAL RANGE)

SHIFT POINT AT LOW SPEED (MANUAL RANGE)

SHIFT POINT AT SET SPEED (DRIVE RANGE)

SHIFT POINT AT HIGH SPEED (MANUAL RANGE)

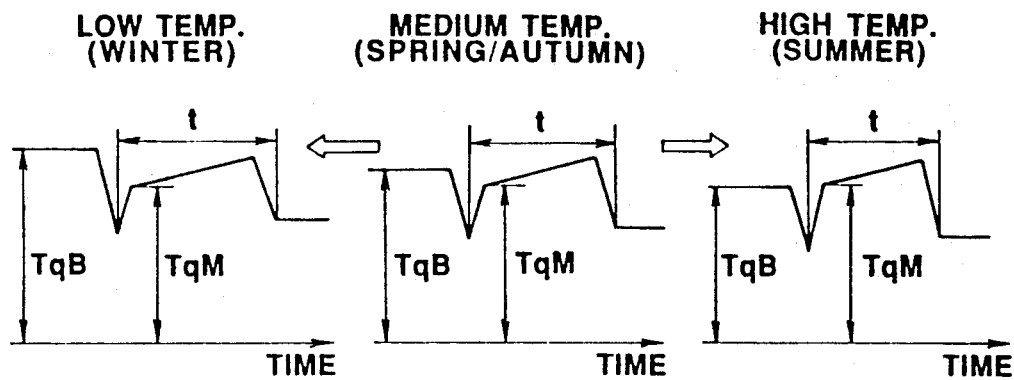
FIG.16A FIG.16B FIG.16C
*(PRIOR ART)* *(PRIOR ART)* *(PRIOR ART)*
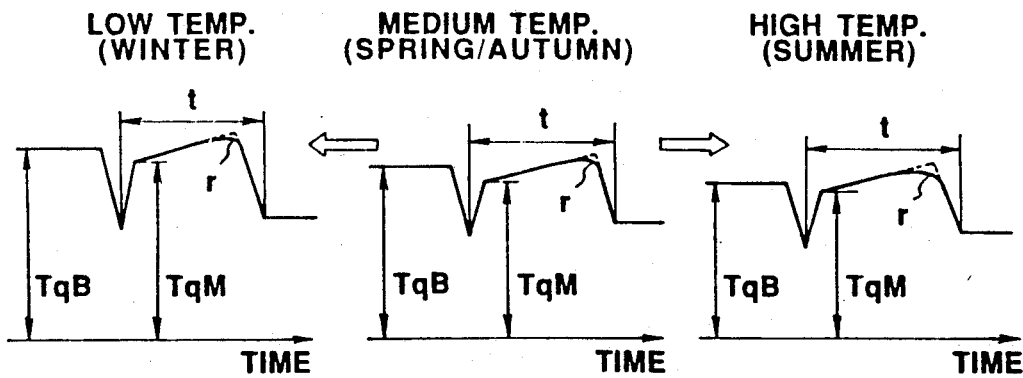
FIG.17A FIG.17B FIG.17C

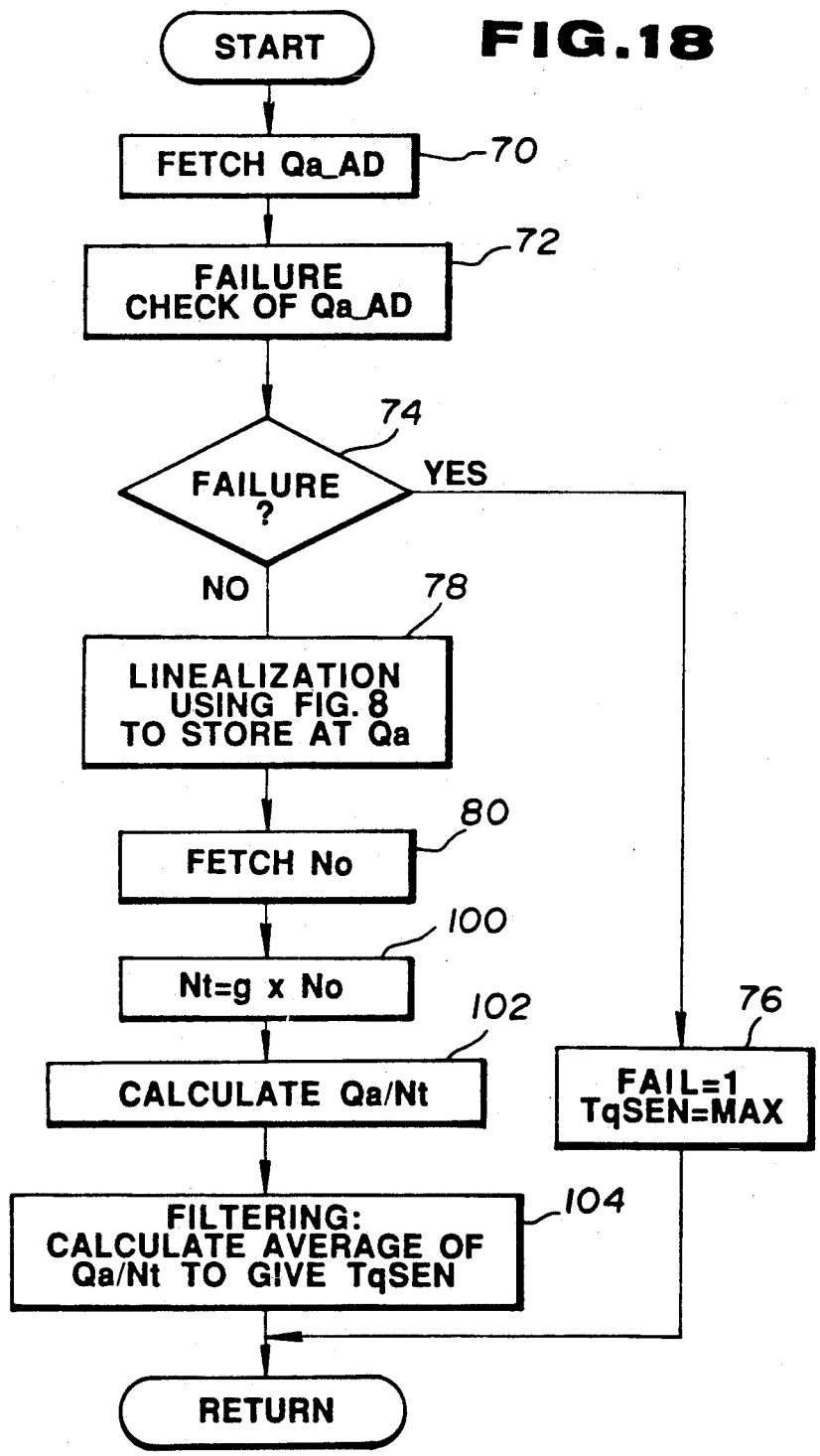

ADAPTIVE CONTROL OF SERVO ACTIVATING PRESSURE FOR MOTOR VEHICLE AUTOMATIC TRANSMISSION

BACKGROUND OF THE INVENTION

The present invention relates to a method of and a system for controlling servo activating hydraulic fluid pressure for a motor vehicle automatic transmission.

An automatic transmission of the RE4R03A type is known. This known automatic transmission is described in a publication "NISSAN FULL-RANGE AUTOMATIC TRANSMISSION RE4R03A TYPE, SERVICE MANUAL, (A261C10)" issued on March 1988 by NISSAN MOTOR COMPANY LIMITED. According to this publication, it is known to determine servo activating hydraulic fluid pressure in response to throttle opening degree. A plurality of line pressure tables are stored in a microcomputer based control unit. Each of the line pressure tables contains line pressure values versus various throttle opening degrees. In this control, the throttle opening degree is used to indicate load on the engine. For a 1-2 upshift, for example, a table look-up operation of a line pressure table for 1-2 upshift is performed using a throttle opening degree to determine servo activating hydraulic fluid pressure supplied to engage on-coming friction device. In this case, the throttle opening degree is used to represent a torque before the 1-2 upshift. Thus, the servo activating hydraulic fluid pressure is fixed to a single value determined by throttle opening degree detected before the shift.

This known system for controlling servo activating hydraulic fluid pressure is not satisfactory in that, with the same throttle opening degree, servo activating hydraulic fluid pressure remains invariable even if there occurs a change in driving force.

An object of the present invention is to provide an adaptive correction of servo activating hydraulic fluid pressure in agreement with driving force variability.

SUMMARY OF THE INVENTION

According to the present invention, the servo activating hydraulic fluid pressure of an automatic transmission is determined in response to a parameter determined as a predetermined function of an airflow rate of intake air admitted to the engine and a predetermined variable that is in a predetermined relationship with revolution speed of an output shaft of the automatic transmission.

BRIEF DESCRIPTION OF THE DRAWINGS

FIGS. 16A, 16B, and 16C are torque curves during the 1-2 upshift at different ambient temperatures with the same throttle opening degree when the on-coming friction device is engaged by servo activating hydraulic fluid pressure determined in response to throttle opening degree;

FIGS. 17A, 17B, and 17C are torque curves during the 1-2 upshift at the different ambient temperatures with the same throttle opening degree when the on-coming friction device is engaged by line pressure determined by parameter TqSEN;

FIG. 18 is a flow diagram of an alternative sub routine for calculating TgSEN;

DETAILED DESCRIPTION OF THE INVENTION

Figure 1:
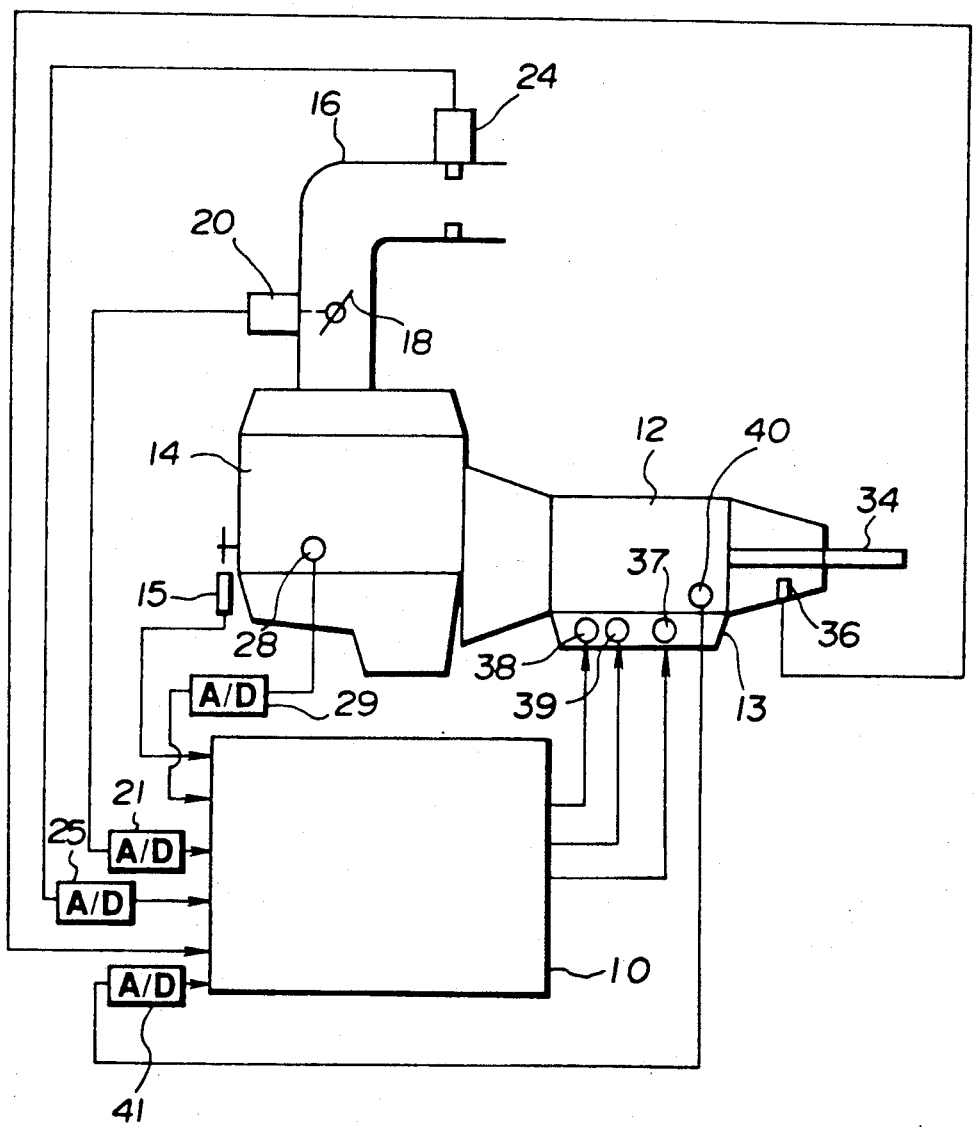
FIG. 1 is a block diagram of a motor vehicle power train.

FIG. 1 shows a motor vehicle power train including ah automatic transmission 12 and an engine 14.

The automatic transmission 12 includes a torque converter, a gear train, and various friction or torque establishing devices, such as clutches and brakes. The torque converter includes a pump impeller drivingly connected to the output shaft of the engine, a turbine runner, and a stator. The pump impeller is in driving connection with a pump. The turbine runner is connected to an input shaft of the gear train. The gear train has an output shaft 34.

The automatic transmission 12 has a control valve assembly 13 provided with a line pressure solenoid 37, a first shift solenoid 38, and a second shift solenoid 39. These solenoids 37, 38, and 39 are controlled by a microcomputer based control unit 10 including a central processor unit (CPU), a read only memory (ROM), a random access memory (RAM), and an input/output inteface circuit (I/O).

An engine speed sensor 15 detects engine speed (engine rpm) of the engine and generates pulses indicative of engine speed detected. Mounted within an intake passage 16 is a throttle valve 18 which opens in degrees. A throttle sensor 20 detects the opening degree of the throttle valve (throttle position) 18 and generates an analog signal indicative of the throttle opening degree detected. The analog signal of the throttle sensor 20 is supplied to an analog-to-digital converter (A/D) 21. Upstream of the throttle valve 18 is arranged a mass air flow meter 24 which detects the mass air flow rate of intake air inducted by the engine 14, and generates an analog signal indicative of the mass airflow rate. This analog signal is supplied to an analog-to-digital converter (A/D) 25. The mass airflow meter 24 is of the well-known hot wire film type. An engine coolant temperature 28 detects the temperature of engine coolant and generates an analog signal indicative of the engine coolant temperature detected. This analog signal is supplied to an analog-to-digital converter (A/D) 29.

An output shaft speed sensor 36 detects revolution speed of the output shaft 34 and generates pulses indicative of the output shaft speed detected. The output shaft speed sensor 36 serves as a transmission mount vehicle speed sensor. Another vehicle speed sensor is mounted in a vehicle speed meter within a passenger compartment of the vehicle. An automatic transmission fluid (ATF) temperature sensor 40 detects the temperature of automatic transmission fluid and generates an analog signal indicative of the ATF temperature detected. This analog signal is supplied to an analog-to-digital (A/D) converter 41.

In FIG. 1, A/D converters 21, 25, 29 and 41 are illustrated as being separated from the control unit 10 for ease of explanation in the following description. Actually, the functions of these analog-to-digital converters are incorporated in the I/O interface circuit of the control unit 10.

Except the mass airflow meter 24, the motor vehicle power train illustrated in FIG. 1 is substantially the same as described in the before-mentioned publication "NISSAN FULL-RANGE AUTOMATIC TRANSMISSION RE4R03A TYPE, SERVICE MANUAL, (A261C10)" issued on March, 1988 by NISSAN MOTOR COMPANY LINITED. For a detailed description, reference should be made to this publication.

Figure 2:
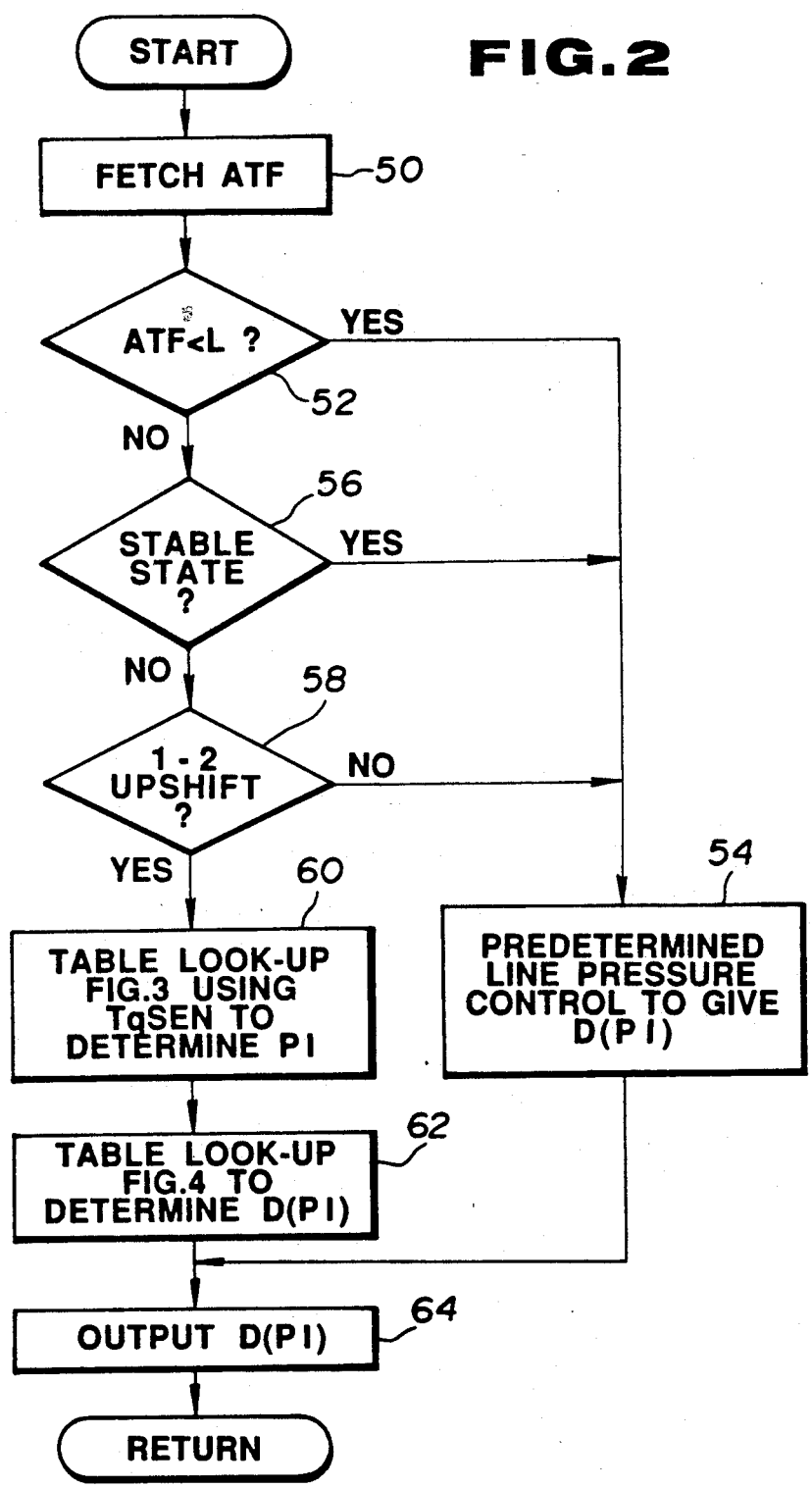
FIG. 2 is a flow diagram of a main routine for determining line pressure.
Figure 6:
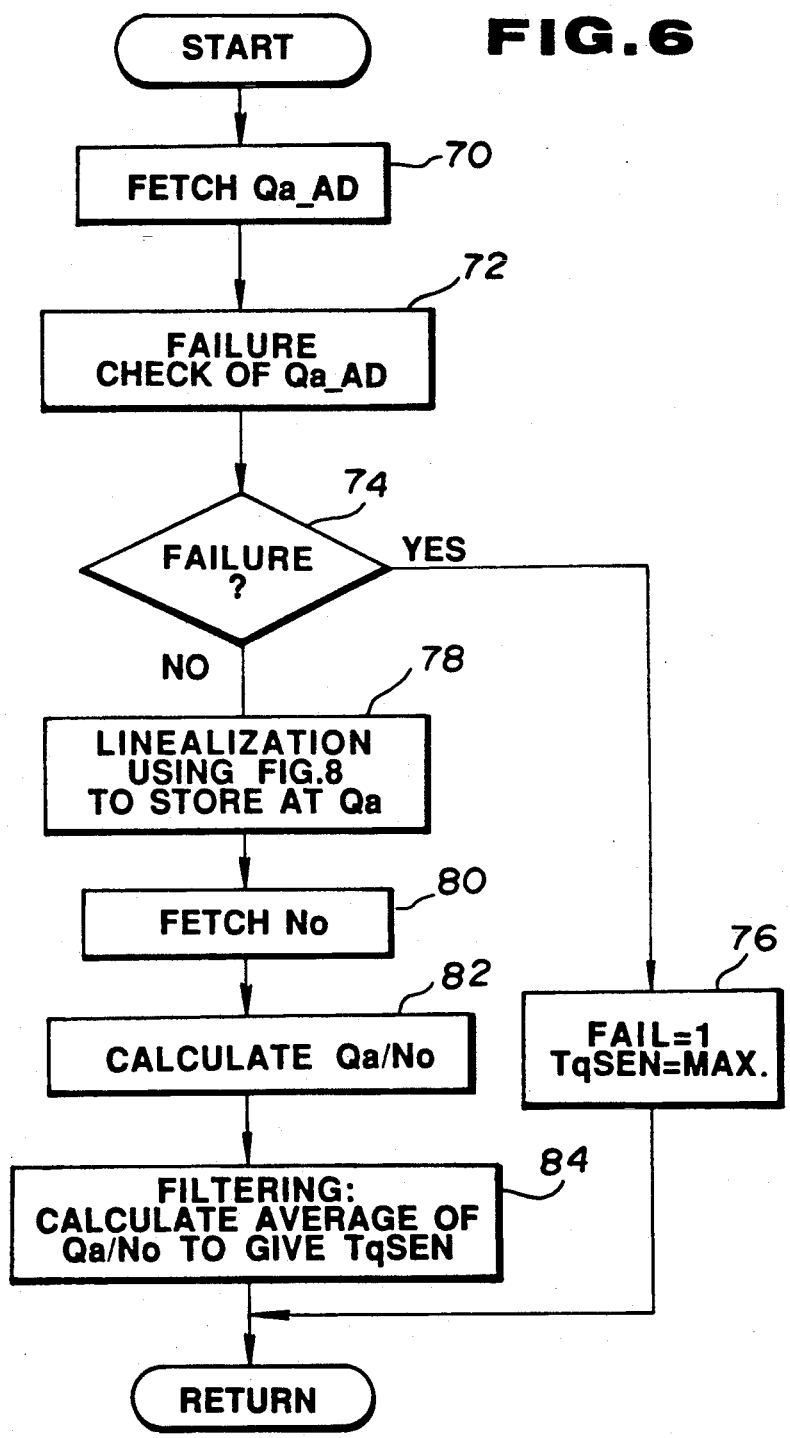
FIG. 6 is a flow diagram of a sub routine for calculating a parameter TgSEN.

Referring to FIGS. 2 and 6, FIG. 2 shows a main routine for determining line pressure and FIG. 6 shows a sub routine for calculating a parameter TqSEN which is used in the main routine in determining servo activating hydraulic fluid pressure during a 1-2 upshift.

Figure 7:
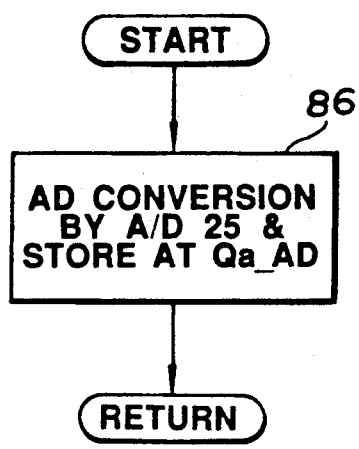
FIG. 7 is a flow diagram of an analog to digital (AD) conversion routine whereby analog output signal of a mass airflow meter to digital signal to store result at Qa_AD.
Figure 8:
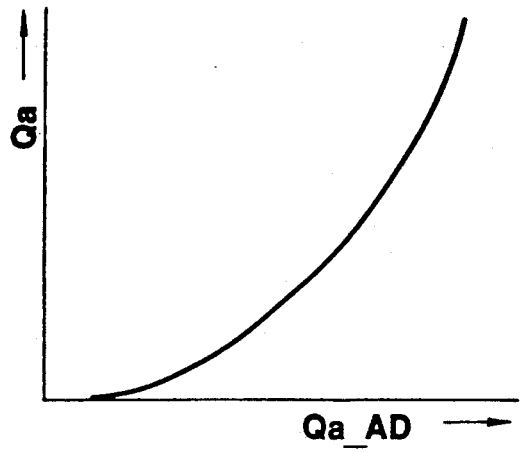
FIG. 8 shows a linear Qa—Qa_AD characteristic of the mass airflow meter.
Figure 9:
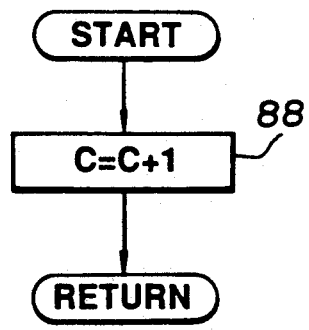
FIGS. 9 and 10 are flow diagrams for calculating revolution speed (No) of transmission output shaft.
Figure 10:
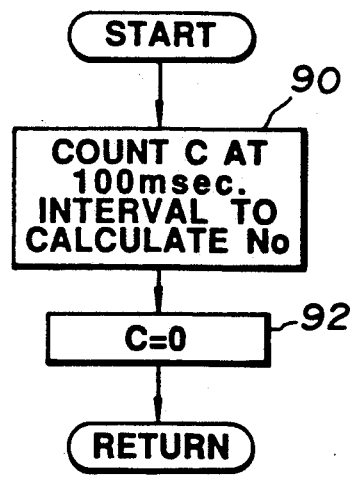

Referring to FIG. 7, execution of this program is repeated at an interval of 5 msec. In a step 86, the analog output signal of mass airflow meter 24 is converted to a digital signal by the A/D converter 25 and the result is stored at Qa_AD in RAM. Actual mass airflow rate detected by the mass airflow meter 24 is in a predetermined relationship with output signal thereof. This predetermined relationship is illustrated by the characteristic curve shown in FIG. 8. In FIG. 8, the vertical axis indicates actual mass airflow rate, while the horizontal axis indicates the digital signal produced after analog to digital conversion of the output signal of mass airflow meter 24. FIGS. 9 and 10 show programs for calculating revolution speed of transmission output shaft 34. Execution of the program shown in FIG. 9 is initiated by pulse generated by output shaft speed sensor 36. In step 88, increment of up-counter C is made. Execution of the program shown in FIG. 10 is repeated at an interval of 100 msec. In step 90, the content of the counter C is counted and the result is used to calculate the output shaft speed. The result of this calculation is stored at No in RAM as output shaft speed. In step 92, the counter C is cleared.

Referring back to FIG. 6, execution of this program is repeated to determine parameter TqSEN which is used during execution of the program shown in FIG. 2. In step 70, the digital data Qa_AD is fetched. In step 72, a failure check of the data Qa_AD is conducted. In step 74, it is determined whether failure exists or not. If the inquiry in step 74 results in a negative, the program proceeds to step 76 where the failure flag FAIL is set and parameter TqSEN is not calculated based on the data Qa_AD fetched in step 70. The parameter TqSEN is set equal to its maximum value MAX. In this circumstance, since the inquiry in step 74 results in an affirmative and thus the data Qa_AD fetched in step 70 is reliable, the program proceeds to step 78. In step 78, a table look-up operation of the characteristic curve shown in FIG. 8 is performed using Qa_AD to store the result at Qa in RAM as mass airflow rate. In step 80, the data No is fetched. In step 82, a ratio Qa/No is calculated. In step 84, the latest data of Qa/No, namely (Qa/No)new, is used to update an average, namely (Qa/No)av. In this embodiment, the average is a weighted average which is expressed as, $$(Qa/No)av = (\tfrac{1}{4}) \times (Qa/No)new + (\tfrac{3}{4}) \times (Qa/No)av.$$

Then, the parameter TgSEN is given which is expressed as, $$TqSEN = Kc \times (Qa/No)av.$$

where, Kc: a predetermined constant.

Referring again to FIG. 1, the analog signal of automatic transmission fluid (ATF) temperature sensor 40 is converted into a digital signal by the A/D converter 41 and the result is stored at ATF in RAM.

Referring to FIG. 2, in step 50, the data ATF is fetched. In step 52, it is determined whether or not the ATF is lower than a predetermined temperature value L, for example 60° C. If this inquiry results in affirmative, the program proceeds to step 54 where a table look-up operation of line pressure table for low temperature is performed using throttle opening degree to give duty D(P1). In step 64, the OFF duty duration per ON-OFF cycle of line pressure solenoid 37 (see FIG. 1) is modulated in response to the duty D(P1) given by predetermined line pressure control starategy in step 54. If the inquiry in step 52 results in a negative, the program proceeds to step 56 where it is determined whether or not automatic transmission 12 is in a stable state after comparing a desired gear position with an actual gear position. If the desired gear position is equal to the actual gear position, a ratio shift is not required and thus the transmission 12 is in a stable state and thus the inquiry in step 56 results in affirmative. In an this circumstance, the program proceeds from step 56 to step 54. In step 54, a table look-up operation of line pressure table for usual temperature is performed using throttle opening degree to give duty D(P1). Then, in step 64, the line pressure solenoid 37 is controlled on the duty D(Pl) obtained in step 54 to give stable-state line pressure vs., throttle opening degree characteristic. If the inquiry in step 56 results in a negative, the type of shift required is checked in step 58. In step 58, it is determined whether a 1-2 upshift is required or not. If the type of shift required is not a 1-2 upshift, a table look-up operation of the usual line pressure table is performed using throttle opening degree to give duty D(P1) and the program proceeds to step 64. The line pressure control performed in step 54 is substantially the same as the conventional line pressure control described on Pages I-29 to I-30 of the publication "NISSAN FULL-RANGE AUTOMATIC TRANSMISSION RE4R03A TYPE, SERVICE MANUAL, (A261C10)."

Figure 3:
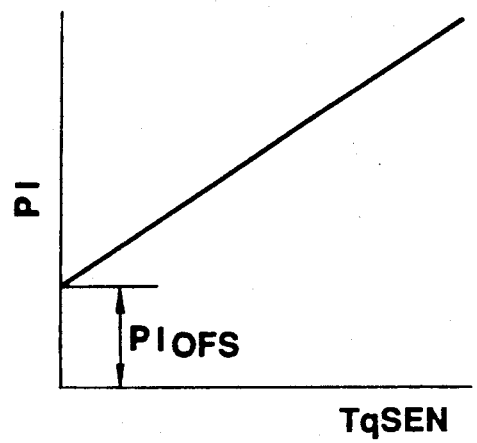
FIG. 3 shows a line pressure table used for table look-up operation in FIG. 2.
Figure 4:
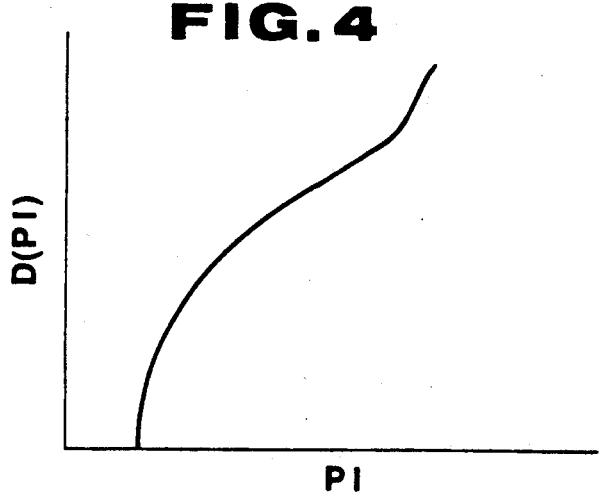
FIG. 4 shows a duty conversion table used for table look-up operation in FIG. 2.
Figure 5:
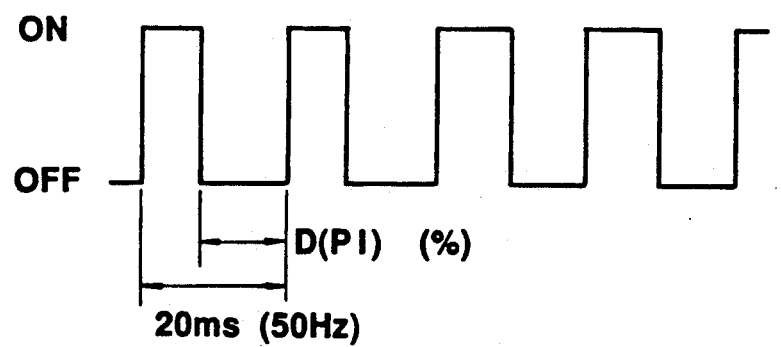
FIG. 5 shows a duty output.

If the inquiry in step 58 results in affirmative and thus a 1-2 upshift is required, the program proceeds to steps 60 and 62 to carry out a line pressure control based on the parameter TqSEN that is determined by executing sub routine shown in FIG. 6. In step 60, a table look-up operation of line pressure table shown in FIG. 3 is performed using parameter TqSEN to store the result, as a line pressure, at PI in RAM. In step 62, a table look-up operation of duty conversion table shown in FIG. 4 is performed using the line pressure data PI to give duty D(P1). Then, in step 64, line pressure solenoid 37 is controlled in response to duty D(P1) determined in step 62 to give a Pl-TqSEN characteristic shown in FIG. 3. In FIG. 3, the reference character $Pl_{OFS}$ denotes an offset predetermined taking return springs of fluid operated servos into account. As shown in FIG. 5, ON-OFF cycle of line pressure solenoid 37 is repeated 50 times per one second. Thus, one cycle is 20 msec, and frequency is 50 Hz. OFF duration in one cycle is determined by duty D(P1). The relationship between servo activating hydraulic pressure (line pressure) and duty D(P1) is such that the hydraulic fluid pressure is in proportion to duty D(P1).

Referring again to FIG. 6, in step 84, the weighted average of Qa/No is calculated. This process which is often called "filtering" is preferrable in eliminating deviation of Qa/No due to variation in mass airflow rate (Qa) and error in calculating output shaft speed (No) so as to minimize influence on servo activating hydraulic fluid pressure. Alternatively, a running average may be used instead of the weighted average. The running average is expressed as, $$(Qa/No)av = (1/N) \times [(Qa/No)old_N + (Qa/No)old_{N-1} \ldots + (Qa/No)old_1],$$

where,
N: a number of sampled data;
$(Qa/No)old_N$; $(Qa/No)old_{N-1}$;
$(Qa/No)old_{N-2}$; ... $(Qa/No)old_1$: data sampled in previous cycles.

Figure 11:
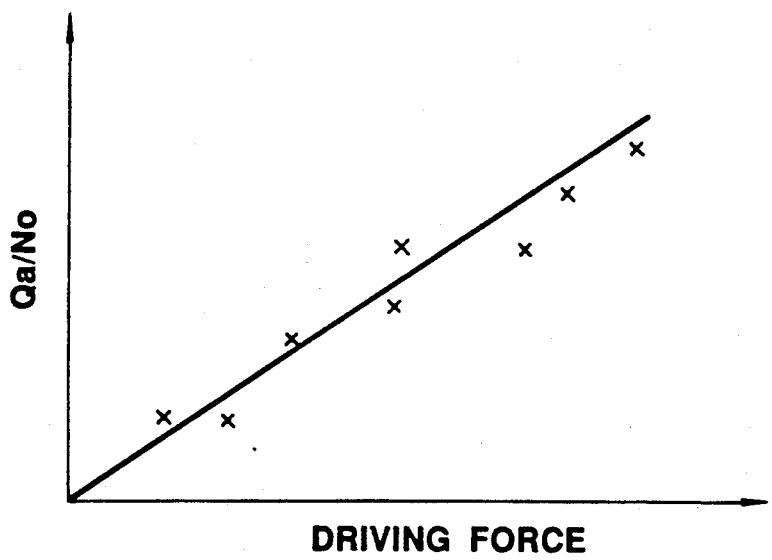
FIG. 11 shows experimental data (Qa/No) plotted versus driving force.

Referring to FIG. 11, experimental data is plotted (reference character x). As seen from FIG. 11, there is a predetermined relationship that ratio Qa/No is in proportion to driving force.

As previously explained, servo activating hydraulic pressure during the 1-2 upshift is determined in response to parameter TqSEN variable with ratio Qa/No. This means that servo activating hydraulic fluid pressure during 1-2 upshift is variable with torque before 1-2 upshift since torque before 1-2 upshift is in proportion to driving force. With the same throttle opening, engine output varies in response to a change in vehicle speed or altitude or ambient temperature. Adaptive correction of servo activating hydraulic fluid pressure with respect to variation in engine output is further explained in connection with FIGS. 12A to 17C. With this correction, the quality of ratio shift is kept at a predetermined satisfactory level.

Figure 12A:
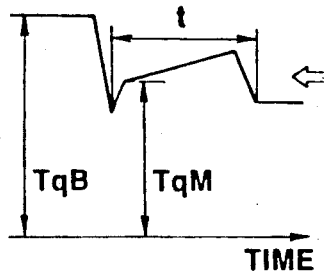
FIGS. 12A and 12C are torque curves during 1-2 upshift at different vehicle speeds with the same throttle opening degree when the on-coming friction device is engaged by servo activating hydraulic fluid pressure determined in response to throttle opening degree.
Figure 12B:
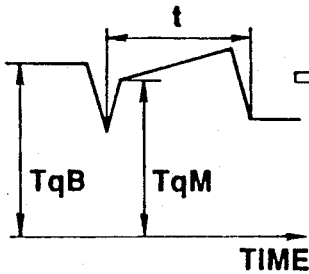
Figure 12C:
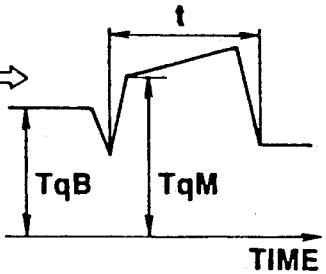
Figure 13A:
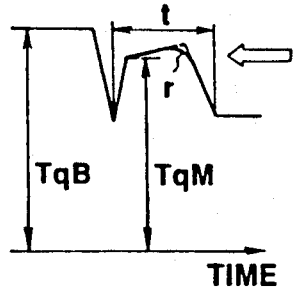
FIGS. 13A, 13B, and 13C are torque curves during 1-2 upshift at the different vehicle speeds as above with the same throttle opening degree when the on-coming friction device is engaged by a servo activating hydraulic fluid pressure determined in response to the parameter TqSEN.
Figure 13B:
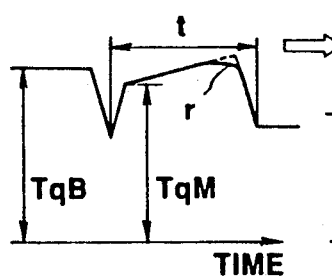
Figure 13C:
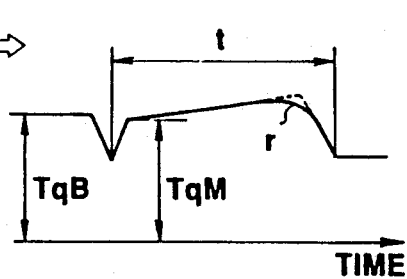

Let us now consider a 1-2 upshift at different vehicle speeds with the same throttle opening degree. FIGS. 12A, 12B, and 12C show torque curves during 1-2 upshift when servo activating hydraulic fluid pressure is determined in response to throttle opening degree. FIGS. 13A, 13B, and 13C show torque curves during a 1-2 upshift when servo activating hydraulic fluid pressure is determined in response to parameter TqSEN in accordance with the present invention.

In determining servo activating hydraulic fluid pressure for a 1-2 upshift, it is the conventional practice to use a line pressure table which contains optimum line pressure values for 1-2 upshift versus different throttle opening degrees The line pressure values of the table are set for optimum performance of on-coming friction device during 1-2 upshift under standard conditions where the 1-2 upshift is initiated at a preset vehicle speed for a given throttle opening degree in accordance with a shift point mapping for drive range, at low altitude, and at medium ambient temperature. A torque curve during a 1-2 upshift under this conditions is shown in FIG. 12B. FIG. 12A shows torque curve during a 1-2 upshift at a vehicle speed L lower than the preset vehicle speed, while FIG. 12C shows a torque curve during a 1-2 upshift at a vehicle speed H higher than the preset vehicle speed. In these torque curves, reference characters TqB and TqM denote torque before a shift and torque during a shift, respectively. Reference character t denotes a time interval of inertia phase. Torque during shift TqM is mainly determined by servo activating hydraulic fluid pressure supplied to the on-coming friction device and thus remains invariable over a variance in shift point, since servo activating hydraulic fluid pressure determined for the same throttle opening degree is fixed.

As readily seen from FIGS. 12A and 12C in comparison with FIG. 12B, torque TqB becomes large at low vehicle speed L, while it becomes small at a high vehicle speed H. Thus, torque TqB varies in inverse proportion to vehicle speed.

Energy to be absorbed during the inertia phase is in proportion to vehicle speed, and a difference in torque before and after the shift is in proportion to torque TqB. However, the time interval t for the inertia phase remains almost unchanged since torque TqB is in inverse proportion to vehicle speed.

Quality of shift may be evaluated based on the ratio TqB/TqM. The ratio is a predetermined optimum value in FIG. 12B, since servo activating hydraulic fluid pressure is adjusted so as to provide a good shift at the preset vehicle speed. In FIGS. 12A and 12C, the ratio deviates from the predetermined value since torque TqM remains the same even though torque TqB becomes large at a low vehicle speed (FIG. 12A) and becomes small at a high vehicle speed (FIG. 12C). This variance in shift quality is difficult to be corrected if servo activating hydraulic fluid pressure is determined in response to throttle opening degree.

Referring to FIGS. 13A, 13B, and 13C, adaptive correction of variance in shift quality due to variance in shift point is described. Torque curves shown in FIGS. 13A, 13B, and 13C result from varying torque TqM by adjusting servo activating hydraulic fluid pressure in response to torque TqB. FIGS. 13A, 13B, and 13C correspond to FIGS. 12A, 12B, and 12C, respectively, in that they show torque curves during a 1-2 upshift at the three different shift points. As will be appreciated from comparing FIG. 13A with FIG. 12A, and comparing FIG. 13C with FIG. 12C, torque TqM is increased in FIG. 13A and decreased in FIG. 13C since servo activating hydraulic fluid pressure is determined in response to TqSEN. Since TqSEN is variable with TqB, torque TqM in proportion to servo activating hydraulic fluid pressure determined in response to TqSEN is in proportion to TqB. More specifically, setting of the line pressure determined in response to TqSEN is such that the ratio TqB/TqM is kept at the predetermined optimum value over a wide range in shift point.

Energy to be absorbed during the inertia phase is in proportion to vehicle speed, and a difference in torque before and after the shift is determined in response to torque TqB. Thus, as shown in FIGS. 13A, 13B, and 13C, the time interval t for the inertia is short at low vehicle speed (see FIG. 13A), while it is long at high vehicle speed (see FIG. 13C).

Energy to be absorbed during the inertia phase is the same if the shift point is the same. Since torque TqM becomes larger in FIG. 13A than in FIG. 12A, the time interval t becomes shorter in FIG. 13A than in FIG. 12A. Similarly, since TqM becomes smaller in FIG. 13C than in FIG. 12C, the time interval t becomes longer in FIG. 13C than in FIG. 12C.

From the preceding description in connection with FIGS. 13A, 13B, and 13C, it will now be understood that servo activating hydraulic fluid pressure is controlled such that ratio TqB/TqM is always adjusted to the optimum value. Thus, good shift quality is maintained over wide range in shift point.

Figure 14A:
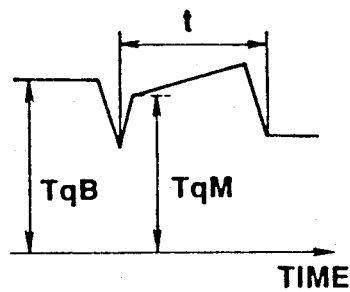
FIGS. 14A and 14B are torque curves during 1-2 upshift at different altitudes with the same throttle opening degree when the on-coming friction device is engaged by servo activating hydraulic fluid pressure determined in response to throttle opening degree.
Figure 14B:
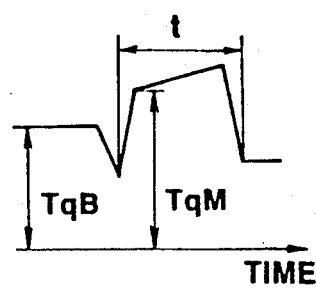
Figure 15A:
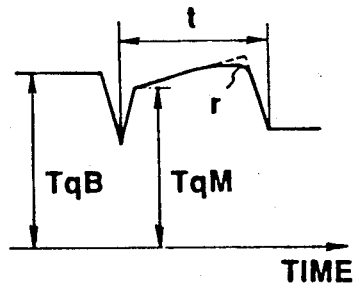
FIGS. 15A and 15B are torque curves during the 1-2 upshift at the different altitudes as above with the same throttle opening degree when on-coming friction device is engaged by servo activating hydraulic fluid pressure determined in response to parameter TqSEN.
Figure 15B:
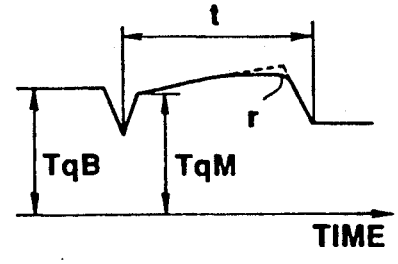

Referring to FIGS. 14A and 14B, it is described what performance deficiencies in ratio shift are caused due to variance in atmospheric pressure, and referring to FIGS. 15A and 15B, it is described how such deficiencies are corrected according to servo activating hydraulic pressure determined in response to TqSEN.

As mentioned before, according to the conventional practice, servo activating hydraulic fluid pressure is determined in response to throttle opening degree and so adjusted as to provide a good shift at low altitude. Atmospheric pressure drops as altitude increases. At high altitude with low atmospheric pressure, air density drops to cause a drop in engine output. FIGS. 14A and 14B show torque curves during 1-2 upshift occurring at the same shift point with the same throttle opening degree but at different altitudes. As seen from FIG. 14B in comparison with FIG. 14A, torque TqB drops at high altitude where air density is low. However, energy to be absorbed during the inertia phase and torque TqM remain invariable. Thus, time interval t for inertia phase becomes short at high altitude, and ratio TqB/TqM deviates from the predetermined optimum value at high altitude.

Adaptive correction of variance in shift quality is described in connection with FIGS. 15A and 15B.

FIG. 15A shows a torque curve during a 1-2 upshift under the same condition as in FIG. 14A. Similarly, FIG. 15B shows a torque curve during a 1-2 upshift under the same condition as in FIG. 14B. Referring to FIG. 15B, since TqSEN is in proportion to torque TqB, torque TqM determined by servo activating hydraulic fluid pressure drops as torque TqB drops due to a change in air density. Thus, ratio TqB/TqM is kept at the predetermined optimum value even at high altitude.

Referring to FIGS. 16A, 16B, and 16C, it is described what performance deficiencies in ratio shift are caused due to a variance in ambient temperature, and referring to FIGS. 17A, 17B, and 17C, it is described how such deficiencies are corrected according to servo activating hydraulic pressure determined in response to TqSEN.

As mentioned before, according to the conventional practice, servo activating hydraulic fluid pressure is determined in response to throttle opening degree and adjusted so as to provide a good shift at medium ambient temperature. Air density increases as ambient temperature decreases in winter, while it decreases as ambient temperature increases in summer. Engine output increases in response to an increase in air density, while decreases in response to a decrease in air density. FIGS. 16A, 16B, and 16C show torque curves during a 1-2 upshift occurring at the same shift point with the same throttle opening degree but at different ambient temperatures. As seen from FIG. 16A in comparison with FIG. 16B, torque TqB increases at low temperature, while as seen from FIG. 16C in comparison with FIG. 16B, torque TqB decreases at high temperature. Since torque TqM remains invariable, ratio TqB/TqM deviates from the predetermined optimum value in FIGS. 16A and 16C.

Adaptive correction of variance in shift quality is described in connection with FIGS. 17A, 17B and 17C.

FIG. 17B shows a torque curve during a 1-2 upshift under the same condition as in FIG. 16B. Similarly, FIGS. 17A and 17C show torque curves during a 1-2 upshift under the same condition as in FIG. 16A and 16C. Referring to FIGS. 17A and 17C, since TqSEN is in proportion to torque TqB, torque TqM determined by servo activating hydraulic fluid pressure drops as torque TqB varies due to a change in air density. Thus, the ratio TqB/TqM is kept at the predetermined optimum value over wide range in ambient temperature.

Referring again to FIGS. 13A, 13B, and 13C, it will be appreciated that the trailing edge of torque curves are rounded as denoted by the reference characters r. This is caused by the fact that TqSEN drops in response to a reduction in intake air flow near the end of shift and servo activating hydraulic fluid pressure also drops in response to TqSEN. The same characteristic is seen in FIGS. 15A, 15B, 17A, 17B, and 17C. This characteristic adds to improvement in shift quality.

A turbo charged engine is used, a turbo lag is unavoidable. With the same throttle opening degree, a 1-2 upshift with turbo in operation and the same shift with turbo not yet in operation show different shift qualities when servo activating hydraulic fluid pressure is determined in response to throttle opening degree. This is because there is a difference in torque TqB. This variance in shift quality is corrected by effecting a shift on servo activating hydraulic fluid pressure determined in response to parameter TqSEN since this parameter follows closely a change in torque TqB. Thus, the deficiency in ratio shift due to time lag is corrected.

Referring to FIG. 18, a second embodiment according to the present invention is described. This embodiment is substantially the same as the previously described first embodiment except that instead of Qa/No, Qa/Nt is used in calculating parameter TqSEN in a sub routine shown in FIG. 18, where Nt is a turbine shaft speed. Turbine shaft speed Nt is determined by a product of No and a gear ratio q before a ratio shift. Gear ratio g during ratio shift is not used in calculating Nt and thus turbine speed Nt is not updated during a ratio shift. Nt is updated upon completion of a ratio shift.

The subroutine shown in FIG. 18 is substantially the same as sub routine shown in FIG. 6, but different in that new steps 100, 102, and 104 are added instead of steps 82 and 84. Referring to FIG. 18, in step 100, output shaft speed No stored in step 80 and a gear ratio g which is determined by control unit 10 are used in calculating turbine speed Nt which is expressed by an equation $Nt = g \times No$. In step 102, ratio Qa/Nt is calculated. In step 104, similar to step 84 shown in FIG. 6, a weighted average of (Qa/Nt)av is used to give parameter TqSEN which is expressed as, $$TqSEN = Kc \times (Qa/Nt)av.$$

The use of Qa/Nt in TqSEN is advantageous over Qa/No in the following respects. Considering ranges in revolution speed versus gear positions of an automatic transmission, it can be said that substantially the same range in turbine speed Nt is used for different gear positions, while ranges in output shaft speed No used for different gear positions are different although they have common area. For example, according to a shift point mapping, a maximum vehicle speed is 50 km/h for 1-2 power-on upshift with full throttle, and a maximum vehicle speed 150 km/h for 3-4 power-on upshift with full throttle. Thus, the range in the ratio Qa/No usable for 3-4 upshift becomes very narrow as compared to the range in the ratio Qa/No usable for 1-2 upshift since range of Qa is common over different gear positions. If, using TqSEN involving Qa/No, a table look-up operation of line pressure table as shown in FIG. 3 is performed in determining servo activating hydraulic fluid pressure for a 3-4 upshift, the probability in error becomes high as compared to a table look-up operation performed in determining servo activating hydraulic fluid pressure for a 1-2 upshift. However, if Qa/Nt is used in TqSEN, the common line pressure table can be used in determining servo activating hydraulic fluid pressure for every ratio shift since substantially the same range in turbine speed Nt is used for different gear positions.

In the previously described embodiments, output shaft speed No is used in each of subroutines (see step 80 in FIG. 6 & FIG. 18). Alternatively, output shaft speed No may be replaced with vehicle speed V since vehicle speed is in proportion to No.

Figure 19:
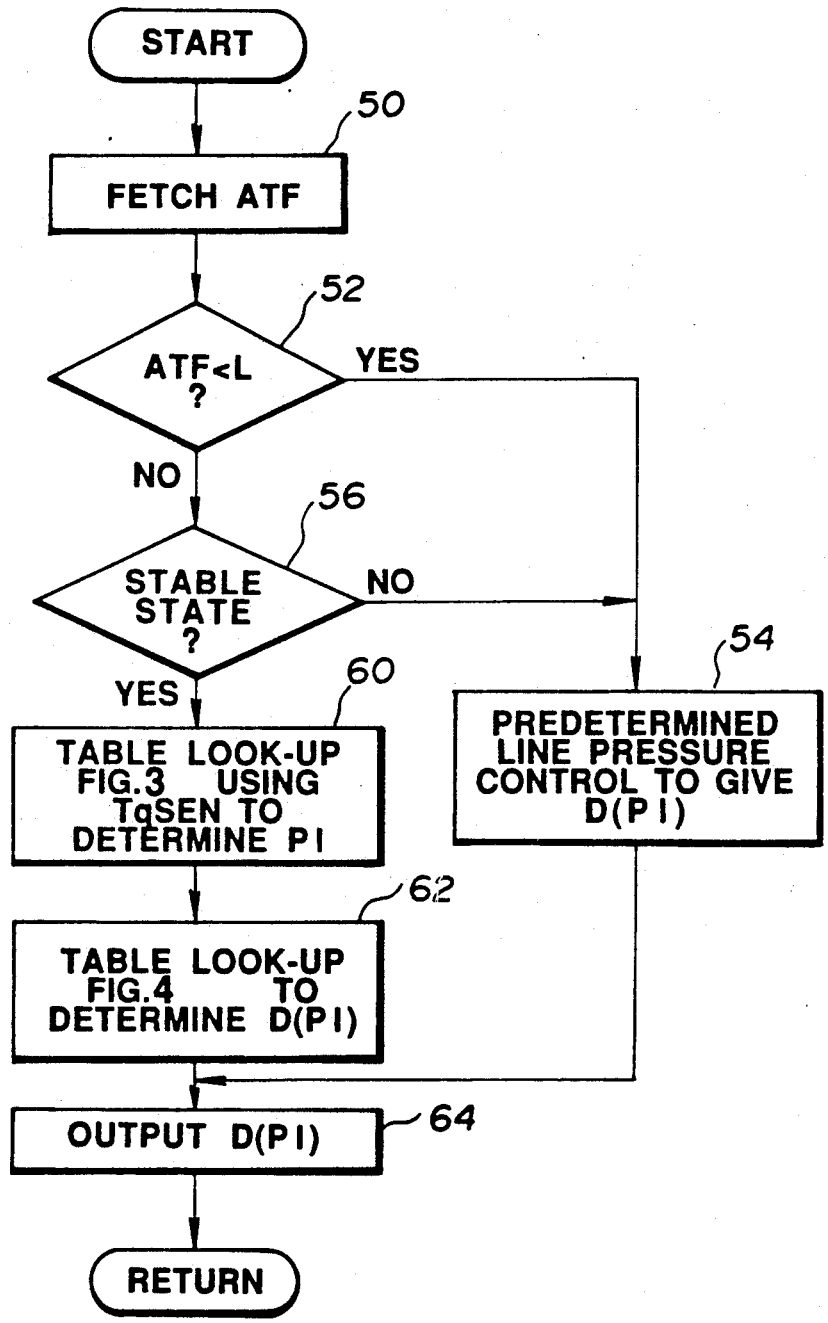
FIG. 19 is a flow diagram of an alternative main routine for determining line pressure.
Figure 20:
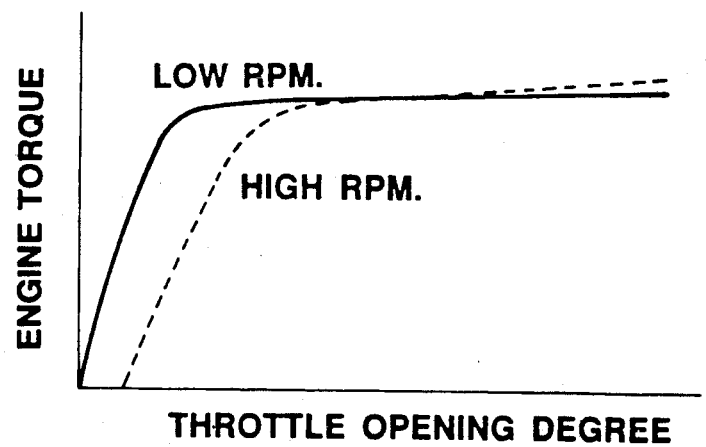
FIG. 20 shows torque versus throttle opening degree characteristic curves at different engine speeds.

Referring to FIGS. 19 and 20, a third embodiment according to the present invention is described. In FIG. 20, the fully drawn curve shows an engine torque versus throttle opening degree characteristic at low engine speed, while the broken line curve shows the characteristic at high engine speed. As readily seen from FIG. 20, throttle opening degree does not reflect engine torque curves. As previously mentioned, it is the conventional practice to determine servo activating hydraulic fluid pressure in response to throttle opening degree. For keeping a proper grip, it is necessary to set a line pressure higher than actually required against actual engine torque in view of the discrepancy between actual engine torque and throttle opening degree as shown in FIG. 20.

This third embodiment is substantially the same as the first embodiment except that a line pressure determining routine shown in FIG. 19 is used instead of the routine shown in FIG. 2. There is great similarity between the routines shown in FIGS. 2 and 9. Thus, the same reference numerals are used to designate similar steps. The routine shown in FIG. 19 is different from the routine shown in FIG. 2 in that if inquiry at step 56 results in negative, program proceeds to step 54 and if it results in affirmative, program proceeds to step 60 and then to step 62, and there is no counterpart of step 58.

Referring to FIG. 19, if an inquiry in step 56 results in a negative, i.e., if ratio shift is required, the program proceeds to step 54 where a table look-up operation of line pressure table for ratio shift is performed using throttle opening degree to give duty D(P1). If an inquiry in step 56 results in an affirmative, a table look-up operation of FIG. 3 is performed using parameter TqSEN to store the result at PI in RAM. In step 62, a table look-up operation of FIG. 4 is performed using the data at PI and store the result at D(PI) in RAM. With the routine shown in FIG. 19, the usual line pressure is determined in response to TqSEN so that the line pressure is corrected to cope with a change in engine torque due to an influence of altitude or ambient temperature or turbo lag.

In this embodiment, the line pressure for ratio shift is determined by a table look-up operation using throttle opening degree. Alternatively, the line pressure for ratio shift may be determined in response to parameter TqSEN.

In this embodiment, Qa/No is used in calculating TqSEN. Alternatively, Qa/Nt may be used in calculating TqSEN by executing the program shown in FIG. 18.

According to the third embodiment, usual line pressure for the stable state is corrected to cope with a change in engine torque, making it possible to minimize load on a pump, resulting in improvement in fuel economy.

What is claimed is:

1. A system for controlling servo activating hydraulic fluid pressure of an automatic transmission of a motor vehicle power train including an engine, the automatic transmission having an output shaft and being shiftable between a plurality of gear positions, the system comprising:

means for detecting an airflow rate of intake air admitted to the engine and generating an airflow rate indicative of said airflow rate detected;

means for detecting a revolution speed of the output shaft of the automatic transmission and generating an output shaft revolution speed indicative signal indicative of said revolution speed detected; and means responsive to said air flow rate indicative signal and said output shaft revolution speed indicative signal for determining a parameter as a predetermined function of said airflow rate and said revolution speed and determining the servo activating hydraulic fluid pressure in response to said parameter.

2. A system as claimed in claim 1, wherein said revolution speed detecting means is an output shaft speed sensor.

3. A system as claimed in claim 2, wherein said predetermined function contains a product of said revolution speed of the output shaft and a gear ratio of one of the plurality of gear positions established in the automatic transmission.

4. A system as claimed in claim 1, wherein the servo activating hydraulic fluid pressure is determined in response to said parameter during shifting in gear position.

5. A system as claimed in claim 1, wherein the servo activating hydraulic fluid pressure is determined in response to said parameter during a stable state of the automatic transmission.

6. A method of controlling servo activating hydraulic fluid pressure of an automatic transmission of a motor vehicle power train including an engine, the automatic transmission having an output shaft and being shiftable between a plurality of gear positions, the method comprising the steps of:
   detecting an airflow rate of intake air admitted to the engine;
   detecting a revolution speed of the output shaft of the automatic transmission; determining a parameter as a predetermined function of said airflow rate and said revolution speed of the automatic transmission; and
   determining the servo activating hydraulic fluid pressure in response to said parameter.

7. A method of controlling servo activating hydraulic fluid pressure of an automatic transmission of a motor vehicle power train including an engine, the automatic transmission having an output shaft and being shiftable between a plurality of gear positions, the method comprising the steps of:
   detecting an airflow rate of intake air admitted to the engine;
   detecting a revolution speed of the output shaft of the automatic transmission;
   determining a ratio of said air flow rate detected and said revolution speed of the output shaft detected;
   determining a parameter as a predetermined function of said ratio determined; and
   determining the servo activating hydraulic fluid pressure in response to said parameter.

8. A system for controlling servo activating hydraulic fluid pressure of an automatic transmission of a motor vehicle power train including an engine, the automatic transmission having an output shaft and being shiftable between a plurality of gear positions, the system comprising: means for detecting an airflow rate of intake air admitted to the engine and generating an airflow rate indicative signal indicative of said airflow rate detected;
   means for detecting a revolution speed of the output shaft of the automatic transmission and generating an output shaft revolution speed indicative signal indicative of said revolution speed detected;
   a control unit comprising
      means responsive to said air flow rate indicative signal and said output shaft revolution speed indicative signal for determining a ratio of said air flow rate and said revolution speed;
      means for determining a parameter as a predetermined function of said ratio; and
      means for determining the servo activating hydraulic fluid pressure in response to said parameter and generating an output signal indicative of the servo activating hydraulic fluid pressure determined; and
   means for controlling the servo activating hydraulic fluid pressure in response to said output signal.

* * * * *